United States Patent
Johnson et al.

(10) Patent No.: US 10,531,035 B1
(45) Date of Patent: Jan. 7, 2020

(54) IMAGE SENSORS WITH PREDICTIVE PRE-CHARGING CIRCUITRY

(71) Applicant: SEMICONDUCTOR COMPONENTS INDUSTRIES, LLC, Phoenix, AZ (US)

(72) Inventors: Richard Scott Johnson, Boise, ID (US); Pawan Gilhotra, Newark, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 35 days.

(21) Appl. No.: 16/037,202

(22) Filed: Jul. 17, 2018

(51) Int. Cl.
*H04N 5/378* (2011.01)
*H04N 5/357* (2011.01)
*H04N 9/04* (2006.01)

(52) U.S. Cl.
CPC ............. *H04N 5/378* (2013.01); *H04N 5/357* (2013.01); *H04N 9/04551* (2018.08)

(58) Field of Classification Search
CPC ..... H04N 5/378; H04N 5/357; H04N 9/04551
See application file for complete search history.

(56) References Cited

U.S. PATENT DOCUMENTS

| | | | |
|---|---|---|---|
| 6,881,942 B2 | 4/2005 | Huang et al. | |
| 7,283,167 B1 | 10/2007 | Schrey et al. | |
| 7,750,958 B1* | 7/2010 | Dierickx | H01L 27/14609 250/208.1 |
| 7,795,650 B2 | 9/2010 | Eminoglu et al. | |
| 8,809,759 B2* | 8/2014 | Mo | H04N 5/355 250/208.1 |
| 9,087,756 B2 | 7/2015 | Golding | |
| 9,307,172 B2 | 4/2016 | Bock | |
| 9,955,091 B1* | 4/2018 | Dai | H01L 27/14643 |
| 2002/0167478 A1* | 11/2002 | LeChevalier | G09G 3/3216 345/98 |
| 2002/0167505 A1* | 11/2002 | LeChevalier | G09G 3/3216 345/204 |

(Continued)

FOREIGN PATENT DOCUMENTS

| | | |
|---|---|---|
| CN | 102932611 B | 10/2012 |
| WO | 2010147990 A1 | 12/2010 |
| WO | 2014055391 A2 | 4/2014 |

*Primary Examiner* — Amy R Hsu
(74) *Attorney, Agent, or Firm* — Treyz Law Group, P.C.; David K. Cole (57) ABSTRACT

An imaging device may have an array of image sensor pixels and image readout circuitry coupled to the array of image sensor pixels. Predictive pre-charge circuitry may be coupled to the array of image sensor pixels and the image readout circuitry. The predictive pre-charge circuitry and the image readout circuitry may perform correlated double sampling operations during charge readout, comparing the charge generated by the array of image pixels to a known reset value. The predictive pre-charge circuitry may pre-charge output lines from the array of image pixels, thereby reducing the time needed for the circuitry to read out the charge after being reset. The output lines may be pre-charged prior to reading out the charge of a row of image sensor pixels based on a voltage associated with the charge generated by at least one previous row of image sensor pixels of the array of image sensor pixels.

20 Claims, 6 Drawing Sheets

(56) References Cited

U.S. PATENT DOCUMENTS

| | | |
|---|---|---|
| 2004/0085086 A1* | 5/2004 | LeChevalier ........ G09G 3/3216 |
| | | 345/84 |
| 2005/0036048 A1 | 2/2005 | Fowler |
| 2008/0266667 A1 | 10/2008 | Min et al. |
| 2010/0315499 A1 | 12/2010 | Maase et al. |
| 2011/0215222 A1 | 9/2011 | Eminoglu et al. |
| 2013/0146749 A1* | 6/2013 | Cieslinski .............. H04N 5/378 |
| | | 250/208.1 |
| 2015/0281613 A1* | 10/2015 | Vogelsang ......... H04N 5/35545 |
| | | 348/300 |
| 2015/0381914 A1 | 12/2015 | Terryn et al. |
| 2016/0035139 A1 | 2/2016 | Fuchs et al. |
| 2016/0234447 A1 | 8/2016 | Guidash et al. |
| 2016/0353033 A1* | 12/2016 | Shin ....................... H04N 5/378 |
| 2016/0360138 A1 | 12/2016 | Meynants |
| 2016/0360140 A1 | 12/2016 | Raynor |

* cited by examiner

IMAGE SENSORS WITH PREDICTIVE PRE-CHARGING CIRCUITRY

BACKGROUND

This relates generally to imaging devices, and more particularly, to imaging sensors having circuitry that can predictively pre-charge output signal lines.

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals generated by the image pixels.

Typical image sensors include column readout circuitry that performs various readout operations including correlated double sampling operations that compare a reset voltage to a signal voltage generated by the image sensor. In conventional systems, column readout operations may take longer than desired.

It would therefore be desirable to be able to provide imaging devices with improved image sensor pixels.

DETAILED DESCRIPTION

Embodiments of the present invention relate to image sensors, and more particularly, to image sensors having predictive pre-charge circuitry. It will be recognized by one skilled in the art, that the present exemplary embodiments may be practiced without some or all of these specific details. In other instances, well known operations have not been described in detail in order to not unnecessarily obscure the present embodiments.

Imaging systems having digital camera modules are widely used in electronic devices such as digital cameras, computers, cellular telephones, and other electronic devices. A digital camera module may include one or more image sensors that gather incoming light to capture an image. Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). Image sensors may include control circuitry such as circuitry for operating the image pixels and readout circuitry for reading out image signals corresponding to the electric charge generated by the photosensitive elements. The control circuitry may include predictive pre-charge circuitry that reduces the time need to read out the image signals.

Figure 1:
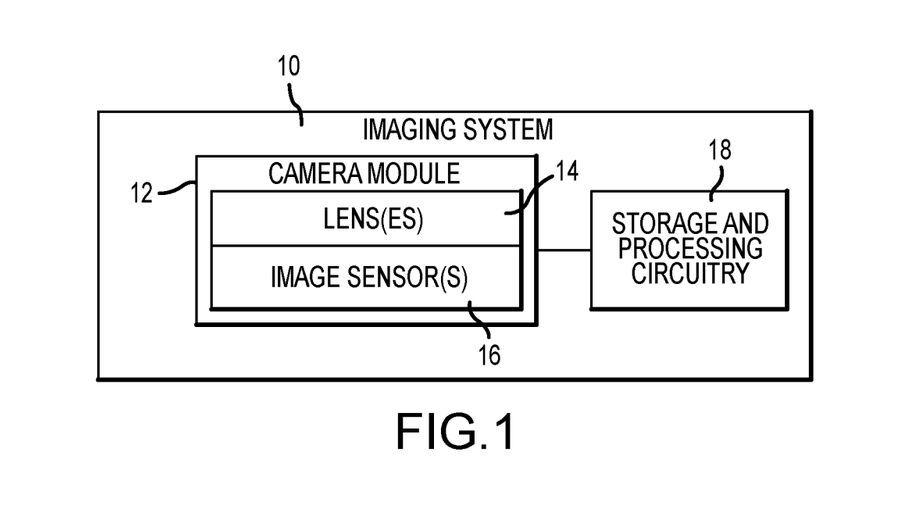
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
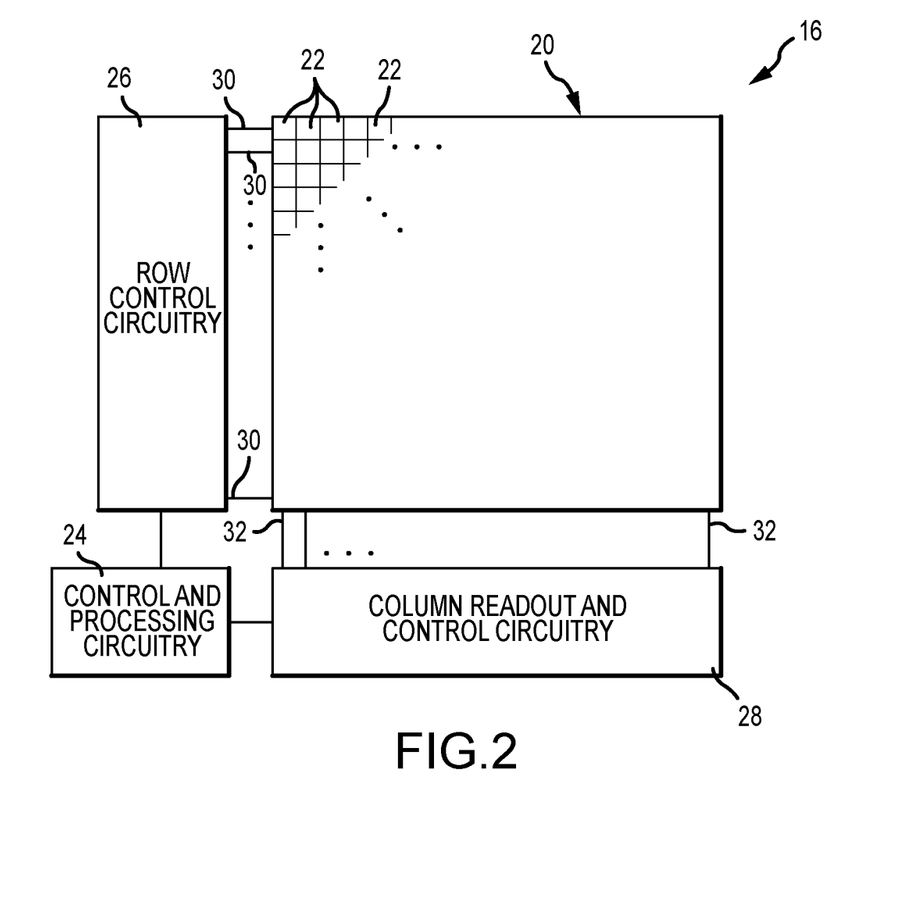
FIG. 2 is a diagram of an illustrative pixel array and associated readout circuitry for reading out image signals from the pixel array in accordance with an embodiment.

As shown in FIG. 2, image sensor 16 may include a pixel array 20 containing image sensor pixels 22 (sometimes referred to herein as image pixels or pixels) arranged in rows and columns and control and processing circuitry 24. Array 20 may contain, for example, hundreds or thousands of rows and columns of image sensor pixels 22. Control circuitry 24 may be coupled to row control circuitry 26 (sometimes referred to as a row decoder) and image readout circuitry 28 (sometimes referred to as column control circuitry, column control and readout circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20.

Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 (sometimes referred to as column readout and control circuitry 28) may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

If desired, image pixels 22 may include one or more photosensitive regions for generating charge in response to image light. Photosensitive regions within image pixels 22 may be arranged in rows and columns on array 20. Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). Alternatively, array 20 may be a monochrome array. The monochrome array may have broadband filters that are visibly transparent and transmit light across the visible light spectrum (e.g., the broadband filters may pass white light to the underlying pixels). In general, however, the monochrome array may have any desired color filters. These examples are merely illustrative and, in general, color filter elements of any desired color and in any desired pattern may be formed over any desired number of image pixels 22.

Image sensor 16 may be configured to support a global shutter operation (e.g., pixels 22 may be operated in a global shutter mode). For example, the image pixels 22 in array 20 may each include a photodiode, floating diffusion region, and local charge storage region. With a global shutter scheme, all of the pixels in the image sensor are reset simultaneously. A charge transfer operation is then used to simultaneously transfer the charge collected in the photodiode of each image pixel to the associated charge storage region. Data from each storage region may then be read out on a per-row basis, for example.

In general, image readout circuitry 28 may determine the charge generated by each pixel 22 using correlated double sampling. In particular, pixel values (e.g., values that correspond to charge generated by the pixels) for each location in array 20 may be calculated by comparing a known reset voltage to the voltage produced by the pixel. However, to perform this comparison, readout circuitry 28 must first be charged to a reset voltage and then to a pixel voltage when each row within array 20 is read out. Changing the charged value from the reset voltage to the pixel voltage requires a settling time. This settling time may be proportional to the difference between the reset voltage and the pixel voltage, for example. To reduce the settling time required during readout operations, predictive pre-charge circuitry may be used to charge column output lines of array 20 to voltages that are based on the voltages of at least one previous row of image pixels in array 20. Pre-charging the column output lines in this way may reduce the difference between the reset voltage and the pixel voltage, thereby reducing the settling time needed during readout operations.

Figure 3:
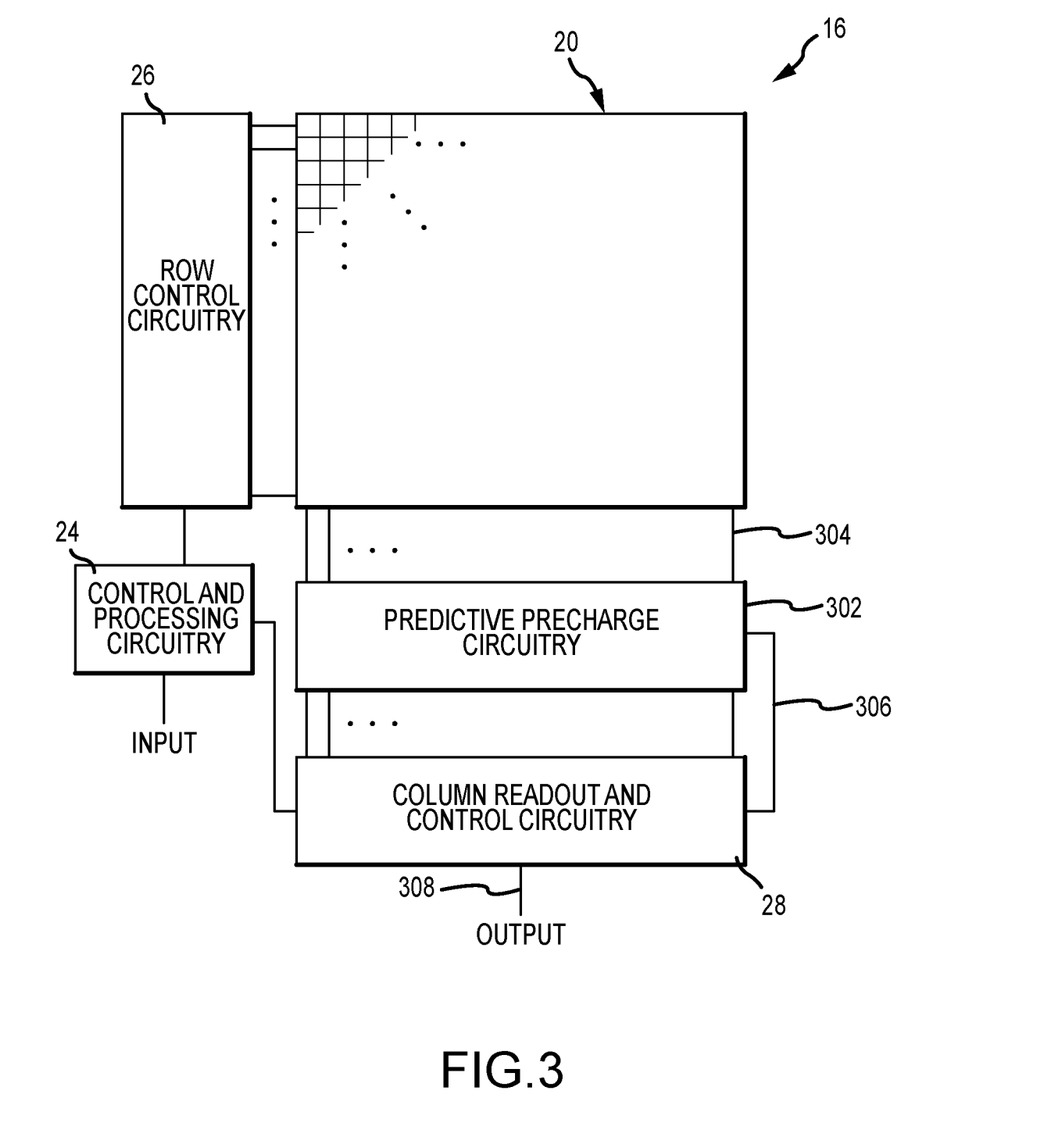
FIG. 3 is a diagram of an illustrative pixel array, predictive pre-charge circuitry, and associated readout circuitry in accordance with an embodiment.

An illustrative image sensor having predictive pre-charge circuitry is shown in FIG. 3. As shown in FIG. 3, predictive pre-charge circuitry 302 may be coupled between array 20 and column readout circuitry 28. Array 20 may be a monochrome array, for example. Predictive pre-charge circuitry 302 may receive charge generated by a first row of image pixels within array 20 over column lines 304. Predictive pre-charge circuitry 302 and column readout and control circuitry 28 may then determine image pixel values or image signals (e.g., values that correspond to the charge generated by each pixel) for the first row image pixels. The image signals may be output over output line 308 and sent back to predictive pre-charge circuitry 302 over line 306 to be stored. Predictive pre-charge circuitry 302 may use the stored image signals during readout operations of the subsequent row. For example, predictive pre-charge circuitry 302 may pre-charge the column output lines to voltages corresponding to the stored image signals. In particular, the voltages corresponding to the stored image signals may be used to decrease the difference between a reset voltage used to reset the readout circuitry and the voltage generated by the image pixels in the current row of array 20. As a result, less settling time may be required when transitioning from reset operations to image signal readout operations.

While predictive pre-charge circuitry 302 has been described as pre-charging the column output lines to voltages corresponding to the stored image signals, this is merely illustrative. Pre-charge circuitry 302 may pre-charge the column output lines to a voltage less than the stored image pixel values (e.g., a fraction of the stored image pixel values) or to a voltage greater than the stored image pixel values, if desired. Following the readout of the subsequent row of image pixel values, the first row of image pixel values may be deleted from the predictive pre-charge circuitry memory, and the subsequent row of image pixel values may be stored. This may be repeated for each row of array 20.

Although predictive pre-charge circuitry 302 is described above as using only the image pixel values from a single previous row to pre-charge the column output lines during readout operations of a given row, this is merely illustrative. Pre-charge circuitry 302 may use an average of all previous rows within array 20, an average of any number of previous rows within array 20 (e.g., an average of two rows, an average of three rows, etc.), or a weighted average of any number of previous rows within array 20. In general, the image pixel values from any number of previous rows may be used by pre-charge circuitry 302 to determine the voltage to which column output lines 304 should be pre-charged. Additionally, any method of averaging the image pixel values from the previous one or more rows may be used.

While predictive pre-charge circuitry 302 may pre-charge the column output lines to the voltage generated by the previous row when using a monochrome image sensor, a non-monochrome sensor may also be used. For example, an image sensor with a Bayer color filter array may be used. In this case, however, the signal generated by a previous row of the array may be different than the signal that would have been generated by a monochrome image sensor (e.g., the signal may be lower due to the presence of the color filters over each image pixels within the Bayer array). Therefore, rather than pre-charging the column output lines based solely on the signal generated by a previous row, pre-charge circuitry 302 may make gain corrections to the signal (e.g., amplify the signal using an amplifier) to produce a corrected signal prior to pre-charging the column output lines. In this way, the corrected signal may be used to pre-charge the column output lines, reducing the settling time during readout operations.

In general, any desired image pixel array (e.g., array of color filters over the image pixels) may be used. Pre-charge circuitry 302 may make gain corrections to the image signals as necessary based on the type of image pixel array.

Although predictive pre-charge circuitry 302 and column readout circuitry 28 are shown as separate boxes in FIG. 3, this is merely illustrative. If desired, predictive pre-charge circuitry 302 and column readout circuitry 28 may be combined into a single circuit or predictive pre-charge circuitry 302 and column readout circuitry 28 may share circuitry components. In general, any arrangement of predictive pre-charge circuitry 302 and column readout circuitry 28 may be used.

As shown in FIG. 3, predictive pre-charge circuitry 302 may be coupled to array 20 and receive charge generated by the image pixels in array 20 prior to the charge being converted to digital signals by the ADC circuitry in column readout circuitry 28 (e.g., predictive pre-charge circuitry 302 may receive analog signals from array 20). Therefore, in this arrangement, predictive pre-charge circuitry 302 may perform pre-charge operations using analog signals received from array 20. Moreover, line 306, along which column readout circuitry 28 sends signals back to predictive pre-charge circuitry 302, may include digital-to-analog (DAC) circuitry to convert the digital signal produced by column readout circuitry 28 into an analog signal to be used by predictive pre-charge circuitry 302. However, this arrangement is merely illustrative. If desired, column readout circuitry 28 may be coupled between predictive pre-charge circuitry 302 and array 20, thereby allowing predictive pre-charge circuitry 302 to receive digital signals. In this case, pre-charge circuitry may not need DAC circuitry. In general, predictive pre-charge circuitry 302 may include any combination of ADC and DAC circuitry to perform conversions between analog and digital signals based on the location of predictive pre-charge circuitry 302 relative to array 20 and column readout circuitry 28.

Figure 4:
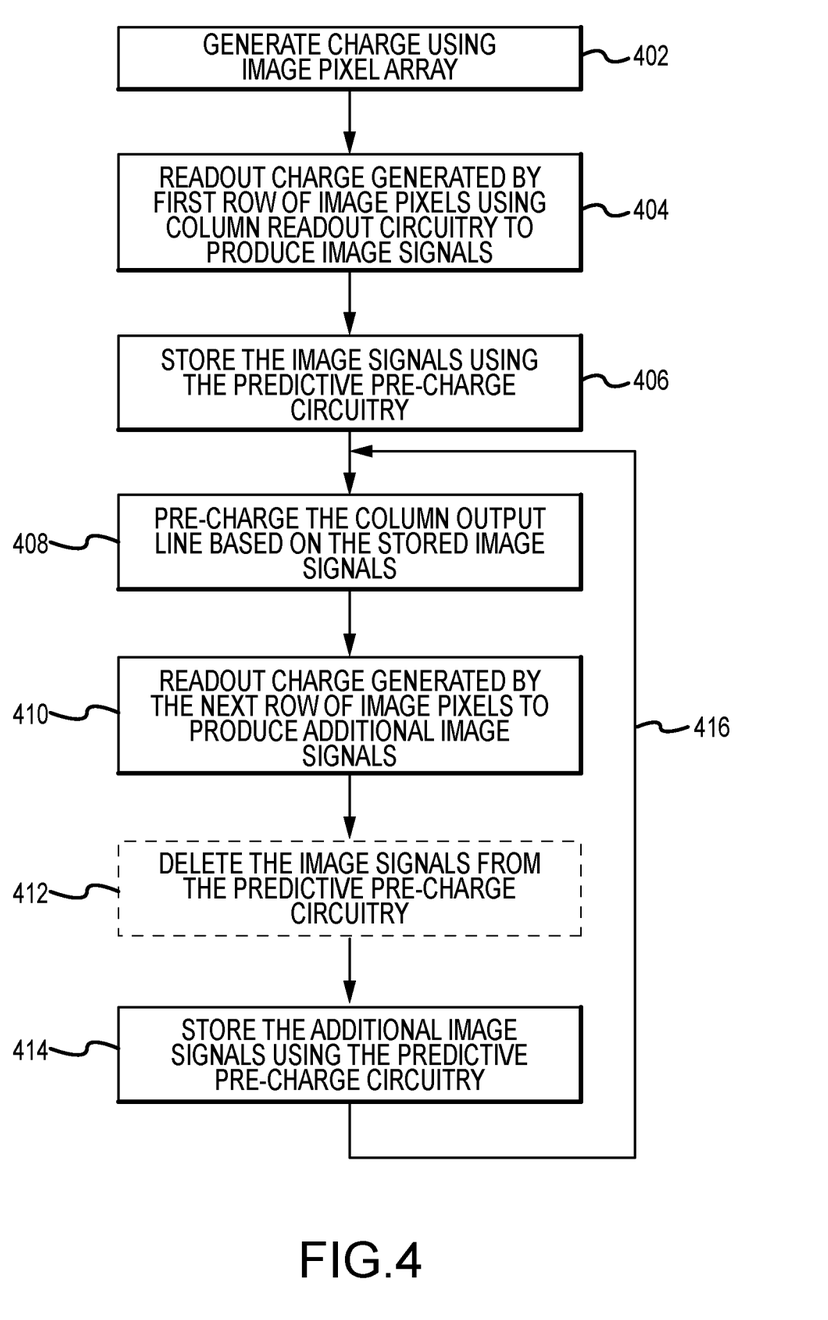
FIG. 4 is a flow chart of illustrative steps that may be performed by the predictive pre-charge circuitry during readout operations in accordance with an embodiment.

FIG. 4 shows a flow chart of illustrative steps that may be performed by predictive pre-charge circuitry 302 to pre-charge column output lines 304 using image pixel values from at least one previous row during readout operations.

At step 402, image pixel array 20 may be used to generate charge in response to light incident on the array. In particular, image pixels arranged in rows and columns within array 20 may generate the charge. The amount of charge generated by each pixel may be proportional to the amount of incident light received by that pixel. Image pixel array 20 may be a monochrome array, a Bayer array, or any other desired array.

At step 404, column readout circuitry 28 may readout the charge generated by the first row of image pixels (e.g., the first row that receives a readout control signal from row control circuitry 26). Column readout circuitry 28 may convert the analog values generated by the first row of image pixels into digital image signals (e.g., image pixel values) using ADC circuitry. The image signals may be output over output line 308.

At step 406, the image signals generated by readout circuitry 28 may be stored using predictive pre-charge circuitry 302. For example, readout circuitry 28 may send the image signals to predictive pre-charge circuitry 302 over line 306. Predictive pre-charge circuitry 302 may have a memory circuitry that can store image signals generated by a single row of image pixels, more than one row of image pixels, or the entire array of image pixels. In general, the predictive pre-charge circuitry memory may be capable of storing image pixel values generated by any desired number of image pixel rows.

At step 408, predictive pre-charge circuitry 302 may pre-charge the column output lines based on the stored image signals. In particular, predictive pre-charge circuitry 302 may pre-charge the column output lines to more than 100% of the stored image signals, to 100% of the stored image signals, to 90% of the stored image signals, to less than 90% of the stored image signals, to 50% of the stored image signals, or to greater than 50% of the stored image signals. In general, the column output lines may be pre-charged to voltages corresponding to any percentage of the stored image signals. The proportion of the stored image signals to which the column output lines are charged may be dependent upon the image pixel array that is used. For example, if a monochrome array is used, predictive pre-charge circuitry 302 may charge the column output lines to 100% of the stored image signals. However, if a Bayer array is used, predictive pre-charge circuitry may first make gain corrections to the stored image signals prior to charging the column output lines. However, this is merely illustrative. In general, predictive pre-charge circuitry 302 may charge the column output lines based on any desired proportion of the image signals generated by the previous row of image pixels.

At step 410, predictive pre-charge circuitry 302 and image readout circuitry 28 may readout charge generated by the next row of image pixels to produce additional image signals. Charge readout operations may include correlated double sampling operations. For example, a reset voltage may be sampled on image readout circuitry 28, modified based on the predictive pre-charge circuit, and read out. Then, the image signal voltage generated by the next row of image pixels may be sampled on image readout circuitry 28. The image signal voltage may be compared to the modified reset voltage, reducing errors that may occur due to offset or errors in the circuitry or due to dark current effects. Because the column output lines have been pre-charged, a voltage difference between a reset voltage and the image signal voltages may be reduced, thereby reducing the time needed for image readout circuitry 28 to transition from the reset voltages to the image signal voltages (and accordingly reduce overall readout time).

At optional step 412, predictive pre-charge circuitry 412 may delete the previous row's image signals from the predictive pre-charge memory. This may allow for the current row's image signals to be stored in the predictive pre-charge memory and to be used for predictively pre-charging the column output lines prior to reading out the charge generated by the next row in array 20. However, if desired, step 412 may be skipped. In particular, the previous row's image signals may be kept in the predictive pre-charge memory. This may be beneficial if it is desired to pre-charge the column lines based on multiple rows of image signals. For example, an average of the previous two rows of image signals, an average of the previous five rows of image signals, or an average of all previous rows of image signals may be used. In general, an average of any number of rows of image signals may be used. Additionally, any desired method may be used to average and weight the rows of image signals when determining the voltages required to pre-charge the column output lines. For example, it may be desired to give more weight to the image signals produced by rows closer to the current row than to image signals produced by rows further from the current row. However, this is merely illustrative. In general, any desired averaging and/or weighting method may be applied to the image signals produced by previous rows of image signals prior to pre-charging the column lines.

At step 414, predictive pre-charge circuitry 302 may store the additional image signals in the predictive pre-charge memory. The additional image signals may be the only image signals in the predictive pre-charge memory (e.g., if image signals from a previous row were deleted from the predictive pre-charge memory in step 412) or may join image signals from previous row(s) in the predictive pre-charge memory (e.g., if step 412 is skipped). In either case, the additional image signals may be used in pre-charging the column output lines prior to reading out the next row of image signals. As indicated by line 416, this process may be continued until the final row in array 20 has been read out.

In general, predictive pre-charge circuitry, such as predictive pre-charge circuitry 302 of FIG. 3, may have any desired configuration. An illustrative configuration of predictive pre-charge circuitry for a single column of array 20 is shown in FIG. 5.

Figure 5:
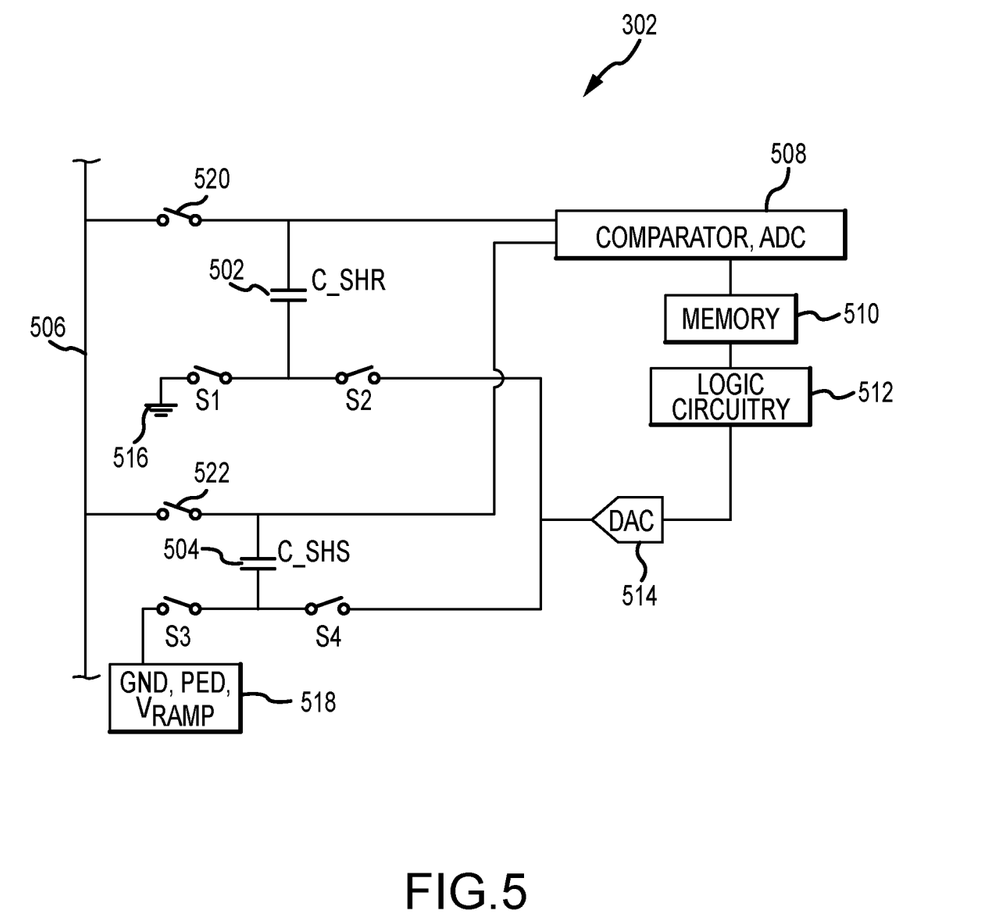
FIG. 5 is a diagram of illustrative predictive pre-charge circuitry that may be used to pre-charge a column output row based on previous image pixel data in accordance with an embodiment.

As shown in FIG. 5, predictive pre-charge circuitry 302 may include two capacitors, C_SHR capacitor 502 and C_SHS capacitor 504, coupled to column output line 506 through respective switches 520 and 522. C_SHR capacitor 502 may be used for sampling a reset voltage, while C_SHS capacitor 504 may be used for sampling voltage generated by the image pixels of array 20 (e.g., a signal voltage). For example, correlated double sampling methods may be used to compare the signal voltage to the reset voltage, reducing errors due to offset and dark current. The top plates of capacitor 502 and capacitor 504 may be connected to comparator and ADC 508. Comparator and ADC 508 may allow for the comparison between the reset voltage and the signal voltage and may allow for the analog signals generated by array 20 to be converted to digital signals. For example, comparator 508 may receive two inputs, one from capacitor 502 and one from capacitor 504. Comparator 508 may output a high signal or a low signal if one the inputs is higher than the other. As an example, comparator 508 may output a high signal if the input from capacitor 502 is higher than the input from capacitor 504, and may output a low signal if the input from capacitor 502 is lower than the input from capacitor 504.

If desired, comparator and ADC 508 may be a part of column readout circuitry 28 of FIG. 3. Comparator 508 may be coupled to memory 510 (also referred to herein as predictive pre-charge memory). Memory 510 may store the image signals (e.g., digital image signals that have been converted by ADC 508) from at least one previous row of image pixels. The stored image signals may be used to pre-charge column output line 506 during readout operations. Memory 510 may be coupled to logic circuitry 512, which may perform addition and subtraction operations based on the stored image signals in memory 510. For example, logic circuitry 512 may add or subtract the stored image signals from the output of comparator 508 (e.g., corresponding to the reset voltage or to the signal voltage). However, this is merely illustrative. In general, logic circuitry 512 may perform any desired operations using the image signals stored in memory 510.

DAC (digital-to-analog conversion) circuitry 514 may be coupled to the output of logic circuitry 512. DAC 514 may be used to convert the stored image signals (e.g., the digital image signals stored in memory 510) before being sent back to capacitors 502 and 504. DAC 514 may be necessary when predictive pre-charge circuitry 302 is configured to process analog signals, for example. The output of DAC 514 may be connected to the bottom plates of capacitors 502 and 504 through respective switches S2 and S4. Switches S2 and S4 may be closed to couple capacitors 502 and 504 to the output of DAC 514, thereby helping to reduce a voltage on capacitors 502 and 504 by the voltage associated with the output of DAC 514 when the bottom plates of capacitors 502 and 504 are respectively connected to ground 516 and 518 by closing switches S1 and S3 and opening switches S2 and S4. For example, the output of a previous row of image pixels, which may be stored in memory 510, may be output from DAC 514 to one or both of capacitors 502 and 504. In this way, a voltage difference between a reset voltage and signal voltage may be reduced, thereby reducing the settling time of the circuit.

The bottom plate of capacitor 502 may also be coupled to ground 516 through switch S1. Switch S1 may couple capacitor 502 to ground when it is desired to reduce the voltage on top plate of capacitor 502 (e.g., reducing the voltage on capacitor 502 using the output of DAC 514).

The bottom plate of capacitor 504 may be coupled to voltage adjustment circuitry 518 (also referred to herein as Vramp circuitry or Vramp), which may ground capacitor 504, apply a pedestal value PED, or apply a ramp voltage, Vramp, through switch S3. For example, it may be desired to apply Vramp to increase the voltage of capacitor 504 steadily until comparator 508 is flipped (e.g., when the output of comparator 508 switches from a high signal to a low signal or from a low signal to a high signal when the voltage of capacitor 504 is equal to the voltage of capacitor 502). In this way, a difference in voltage between capacitors 502 and 504 may be determined. Vramp may be increased while S3 is closed to increase the voltage of capacitor 504 until the output of comparator 508 is flipped. In general, comparator 508 may additionally have some offset (e.g., error). As an example, the comparator may flip at a voltage different from (e.g., offset from) the point at which the voltage of capacitor 504 is equal to the voltage of capacitor 502. To determine this offset, offset sampling operations may be used.

In one suitable operation, a reset voltage may be applied to capacitors 502 and 504 through column output line 506 (e.g., by closing switches 520 and 522). The reset voltage may be a known voltage that can be used for correlated double sampling operations. Switches S2 and S4 may then be closed (e.g., the bottom plates of capacitors 502 and 504 may be connected to the output of DAC 514). Switches S2 and S4 may then be opened and switches S1 and S3 may be closed, thereby reducing the voltage on the top plates of capacitors 502 and 504 by the voltage associated with the output of DAC 514. A known pedestal voltage, PED, may then be applied to the bottom plate of capacitor 504 by voltage adjustment circuitry 518 through switch S3. The pedestal voltage may reduce the voltage associated with capacitor 504 by a known value, thereby ensuring that there will be a measurable difference between the voltages associated with capacitors 502 and 504 at comparator 508. Voltage adjustment circuitry 518 may then apply a steadily increasing voltage (e.g., Vramp) to the bottom plate of capacitor 504 until the voltage associated with capacitor 504 is equal to the voltage associated with capacitor 502, at which point the comparator flips. The difference in voltage between capacitors 502 and 504 (e.g., based on a difference between the value of Vramp prior to increasing the voltage associated with capacitor 504 and the value of Vramp when the comparator flips) may be stored in memory 510 or in reset memory associated with image readout circuitry 28. This difference in voltage (e.g., associated with the reset voltage) may correspond to the pedestal voltage applied to capacitor 504 and any offset associated with comparator 508.

After this difference in voltage has been stored, a signal voltage generated by an image pixel in array 20 may be applied to the top plate of capacitor 504 (e.g., through column output line 506, by closing switch 522). A pedestal voltage may again be applied to the bottom plate of capacitor 504 by voltage adjustment circuitry 518, with switch S4 open and switch S3 closed (e.g., the bottom plate of capacitor 504 may be coupled to circuitry 518). The pedestal voltage may again ensure a measurable difference between the voltages of capacitors 502 and 504 when measured by the comparator. Vramp may then be applied to the bottom plate of capacitor 514 and be increased steadily until the voltage associated with capacitor 504 is equal to the voltage associated with capacitor 502, at which point the comparator flips. The difference in voltage between capacitors 502 and 504 (e.g., based on a difference between the value of Vramp prior to increasing the voltage associated with capacitor 504 and the value of Vramp when the comparator flips) may be stored in memory 510 or in signal memory associated with image readout circuitry 28. This difference in voltage (e.g., associated with the signal voltage) may correspond to a difference between the signal voltage and the modified reset voltage (e.g., the reset voltage modified based on the output of the previous row), any may also include the pedestal voltage and any offset associated with comparator 508. The reset voltage difference previously stored in the memory may then be subtracted from the signal voltage difference (e.g., to remove the pedestal voltage and the offset, yielding the signal voltage and the reset value), and the output of DAC 514 may be added to the difference (e.g., giving the signal voltage and the voltage of the previous row), resulting in an output image signal. As an example, logic circuitry 512 may perform the various addition and subtraction operations. The output image signal may be output over column output line 506 and may also be stored in predictive pre-charge memory 510 to be used during the readout operations for the next row of image pixels. This process may be repeated for each row in array 20.

Figure 6A:
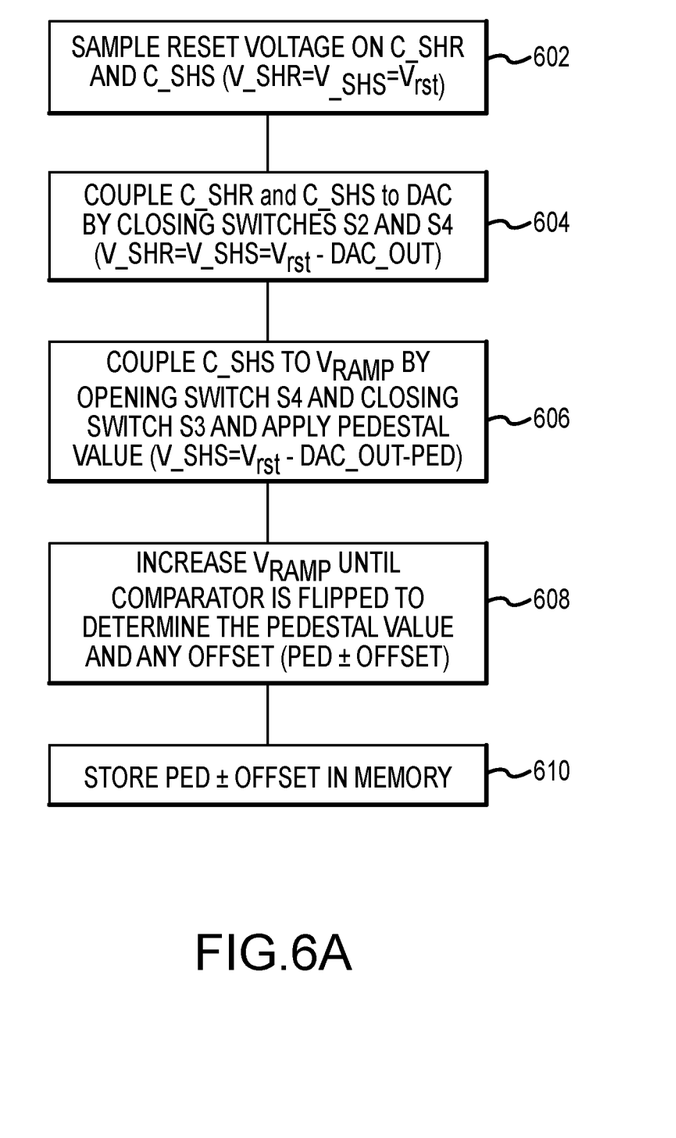
FIG. 6A is a flow chart of illustrative steps that may be performed by the predictive pre-charge circuitry during reset operations in accordance with an embodiment.
Figure 6B:
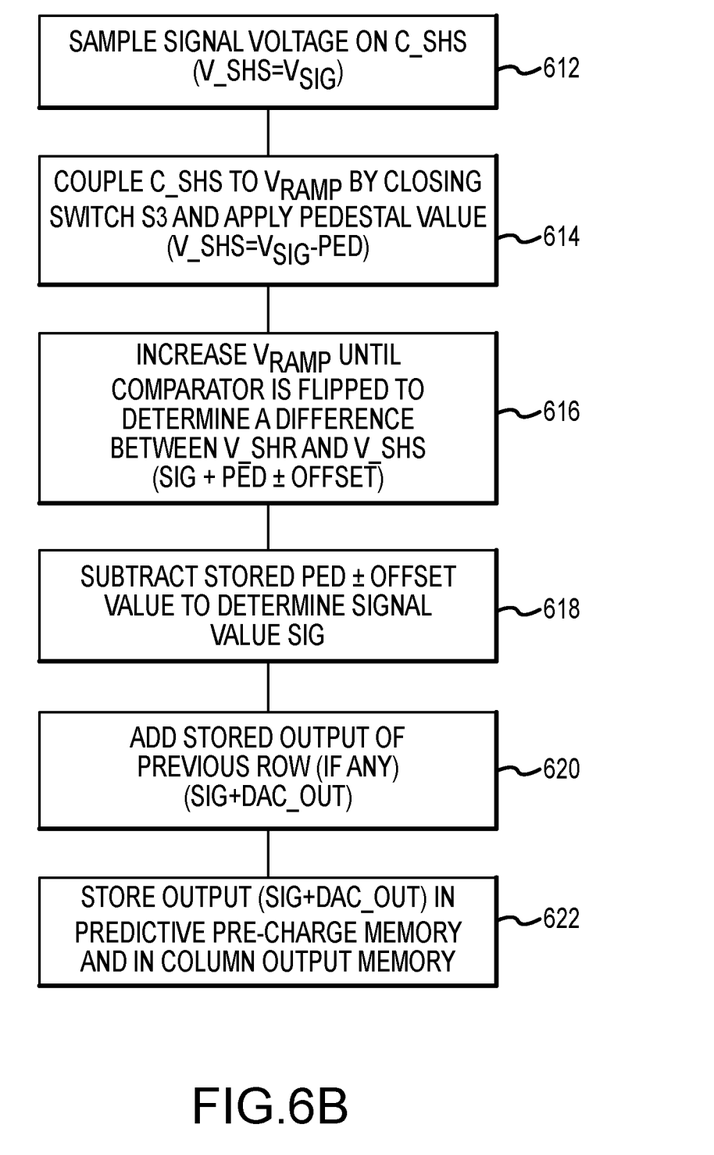
FIG. 6B is a flow chart of illustrative steps that may be performed by the predictive pre-charge circuitry during image signal readout operations in accordance with an embodiment.

Flow charts showing illustrative steps that may be performed by predictive pre-charge circuitry 302 are shown in FIGS. 6A and 6B. In particular, illustrative reset operation steps are shown in FIG. 6A.

At step 602, a reset voltage (referred to herein as Vrst) may be sampled on capacitors 502 and 504 through column output line 506 (e.g., by closing switches 520 and 522). The reset voltage may be equal to 1.8V, may be less than 1.8V, or may be greater than 1.0V. In general, any desired reset voltage may be applied. At this point, the voltage on C_SHR capacitor 502 (referred to herein as V_SHR) and the voltage on C_SHS capacitor 504 (referred to herein as V_SHS) are both equal to the reset voltage, Vrst.

At step 604, capacitors 502 and 504 may be coupled to DAC 514 by closing respective switches S2 and S4. In this way, the bottom plates of capacitors 502 and 504 may receive the output of DAC 514 (referred to herein as DAC_OUT). The voltages across capacitors 502 and 504 (V_SHR and V_SHS) may both be equal to Vrst−DAC_OUT.

At step 606, capacitors 502 and 504 may be disconnected from DAC 514 by opening switches S2 and S4 and respectively coupled to ground 516 by closing switch S1 and to circuitry 518 by closing switch S3. Voltage adjustment circuitry 518 may ground the bottom plate of capacitor 504. After grounding capacitor 502 and 504, a known pedestal voltage (referred to herein as PED) may be applied to the bottom plate of capacitor 504. Following the application of the pedestal voltage, the voltage on capacitor 504 (V_SHS) may be equal to Vrst−DAC_OUT−PED, and the voltage on capacitor 502 (V_SHR) may still be equal to Vrst−DAC_OUT.

At step 608, Vramp may be applied to the bottom plate of capacitor 504 and may be increased (e.g., an increasing voltage may be applied to the bottom plate of capacitor 504) until comparator 508 is flipped (e.g., the voltage on capacitor 502 is equal to the voltage on capacitor 504). A difference in Vramp prior to being increased and Vramp after the comparator has flipped is equal to a voltage of the pedestal voltage and any offset associated with comparator 508 (e.g., PED±OFFSET). In this way, any offset associated with comparator 508 may be calculated.

At step 610, the pedestal voltage and offset may be stored in memory 510. Alternatively or additionally, the pedestal voltage and offset may be stored in column memory associated with image readout circuitry 28.

Following these reset operations, signal readout operations may be performed by predictive pre-charge circuitry 302. Illustrative signal readout operations are shown in FIG. 6B.

At the beginning of the signal readout operations, the voltages associated with capacitor 504 (V_SHS) and capacitor 502 (V_SHR) may both be equal to Vrst−DAC_OUT. At step 612, a voltage generated by an image pixel in array 20 (e.g. a signal voltage, referred to herein as Vsig) may be sampled on capacitor 504 through column output line 506. The voltage associated with capacitor 504 (V_SHS) may then be equal to Vsig. The voltage associated with capacitor 502 (V_SHR) is still equal to Vrst−DAC_OUT at this point.

At step 614, capacitor 504 may be coupled to Vramp by closing switch S3. Voltage adjustment circuitry 518 may be used to apply a known pedestal voltage (referred to herein as PED) to the bottom plate of capacitor 504. This pedestal voltage may be the same as the pedestal voltage applied to capacitor 504 in step 606 of FIG. 6A, for example. After the pedestal voltage has been applied to capacitor 504, the voltage on capacitor 504 (V_SHS) may be equivalent to Vsig−PED. The voltage associated with capacitor 502 (V_SHR) may still be Vrst−DAC_OUT at this point.

At step 616, Vramp may be increased (e.g., an increasing voltage may be applied to the bottom plate of capacitor 504) until comparator 508 is flipped (e.g., the voltage on capacitor 502 is equal to the voltage on capacitor 504). A difference in Vramp prior to being increased and Vramp after the comparator has flipped is equal to the modified reset voltage minus the signal voltage and pedestal value, along with any offset. Because the modified reset voltage is known, the value at which the comparator flips correlates directly with the signal voltage, and may be denoted as SIG+PED±OFFSET. The signal value SIG may be equivalent to the difference between the signal voltage of the previous row and the signal voltage of the present row. In general, signal value SIG may be positive or negative, based on whether the voltage of the present row is greater or less than the previous row (e.g., whether the present row is brighter or darker than the previous row).

At step 618, the stored pedestal and offset values (e.g., the PED±OFFSET value stored in step 610 of FIG. 6A) may be subtracted from the SIG+PED±OFFSET value (e.g., using logic circuitry 512), yielding the signal value SIG. For example, logic circuitry 512 may perform these subtraction operations.

At step 620, the stored output (e.g., equivalent to the DAC_OUT value) of a previous row (if any) may be added to the signal (e.g., using logic circuitry 512), yielding SIG+DAC_OUT. The stored output may be applied if previous rows of array 20 have already been read out. For example, the first row may not rely upon a stored output, but each subsequent row may use at least one previous row's value during readout operations.

At step 622, SIG+DAC_OUT may be stored in predictive pre-charge circuitry memory 510 (e.g., to be used to pre-charge the column output lines prior to the next row's readout operations) and may be stored in column output memory associated with image readout circuitry 28 (e.g., to be outputted from the image sensor). If desired, the column output memory may convert the signal value SIG back into an absolute signal voltage Vsig for the given row by adding the signal value SIG to the absolute signal voltage of the previous row.

Reset operation steps 602 through 610 of FIG. 6A and signal readout steps 612 through 624 of FIG. 6B may be repeated for each row of array 20 until every row of the array has been read out.

While FIGS. 6A and 6B show steps that may be performed by predictive pre-charge circuitry 302, the steps are merely illustrative. In general, predictive pre-charge circuitry may perform any combination of reset and signal readout operations, using the output of previous rows of image data to pre-charge output lines prior to performing the readout operations. In this way, the time required for the readout circuitry to perform correlated double sampling operations and read out the charge generated by an image pixel array can be reduced.

Various embodiments have been described illustrating imaging systems having predictive pre-charge circuitry that can reduce the time required to perform charge read out operations. Various methods of using predictive pre-charge circuitry have also been described to reduce the settling time.

In accordance with an embodiment, an image sensor may have an array of pixels arranged in rows and columns that may generate image signals in response to incident light. Column output lines may be coupled to the columns of the array and may output the image signals generated by the pixels in a respective row of pixels. Predictive pre-charge circuitry may be coupled to the column output lines and may pre-charge the column output lines based on the image signals generated by at least one previous row of the array of pixels before the image signals generated by the pixels in the respective row of pixels are output over the column output lines.

The image sensor may also include column readout circuitry that is coupled to the predictive pre-charge circuitry and that may read out the image signals generated by the array of pixels. The predictive pre-charge circuitry may include memory that stores the image signals generated by at least one row of image pixels. The memory may store image signals generated by a single row of image pixels or image signals generated by a plurality of rows of image pixels. Depending on the capacity of the memory and the desired functionality, the predictive pre-charge memory may pre-charge the column output lines based on the image signals generated by a single previous row of the array of image pixels or based on an average of the image signals generated by a plurality of previous rows of the array of image pixels.

The predictive pre-charge circuitry may further include first and second capacitors that are coupled to one of the column output lines and that are coupled to the memory through respective first and second switches. At least one of the first and second capacitors may receive the stored image signals from the predictive pre-charge memory. The second capacitor may be coupled to a ramp voltage through a third switch. The predictive pre-charge circuitry may also include a comparator coupled to the first and second capacitors and may compare voltages stored on the first and second capacitors as the ramp voltage applies an increasing voltage to the second capacitor. The comparator may include analog-to-digital conversion (ADC) circuitry and the predictive pre-charge circuitry may include digital-to-analog conversion (DAC) circuitry coupled between the memory and the first and second switches.

The array of pixels may be a monochrome array, and the predictive pre-charge circuitry may pre-charge the column output lines using the image signals generated by at least one previous row of image pixels. Alternatively, the array of pixels may be a Bayer array, and the predictive pre-charge circuitry may make gain corrections to the image signals generated by at least one previous row of image signals to produce corrected image signals prior to using the corrected image signals to pre-charge the column output lines.

In some embodiments, predictive pre-charge circuitry may be used to predictively pre-charge column output circuitry. An image pixel array that has rows and columns of image pixels may generate image signals. The column output circuitry may be used to read out the image signals generated by a first row of image pixels. These image signals may be stored using the predictive pre-charge circuitry. The predictive pre-charge circuitry may charge the image sensor output circuitry based on the stored image signals. The column output circuitry may then read out the image signals generated by a second row of image pixels. These image signals may then be stored in the predictive pre-charge memory. If desired, these steps may be performed for each remaining row of image pixels in the image pixel array.

The image sensor output circuitry may be charged based on image signals that are generated by a single previous row of image pixels. Alternatively, the image sensor output circuitry may be charged based on an average of the image signals generated by a plurality of previous rows of image pixels. The image pixel array may be a monochrome array, and the output circuitry may be charged using the image signals generated by a previous row of image pixels. Alternatively, the image pixel array may be a Bayer array, and the predictive pre-charge circuitry may make gain corrections to the image signals generated by a previous row of image pixels to produce corrected image signals prior to charging the output circuitry using the corrected image signals.

In accordance with an embodiment, an image sensor may include an image pixel array that includes rows and columns of image pixels that may generate image signals. Column output lines may be coupled to the columns of image pixels, and column readout circuitry may be coupled to the column output lines to read out the generated image signals generated by each row of image pixels. Predictive pre-charge circuitry may be coupled between each of the column output lines and the column readout circuitry. The predictive pre-charge circuitry may include first and second capacitors coupled to a respective one of the column output lines, a comparator coupled to top plates of the first and second capacitors, and memory circuitry coupled to the comparator and to bottom plates of the first and second capacitors through respective first and second switches. The memory circuitry may store image signals generated by at least one previous row of image pixels and may sample the stored image signals on the bottom plate of the second capacitor before the image signals generated by a respective row of image pixels are read out.

The column output line may apply a reset voltage to the first and second capacitors. The memory circuitry may then apply the stored image signals to the first and second capacitors, reducing the voltage on the first and second capacitors. The comparator may then determine a first difference between the voltages on the first and second capacitors to determine any offset associated with the comparator.

The column output line may then apply an image signal to the second capacitor, and the comparator may determine a second difference between the voltages on the first and second capacitors to determine a signal voltage. The predictive pre-charge circuitry may store the signal voltage in the memory circuitry to be used when reading out the image signals from the next row of image pixels, and the column readout circuitry may output the signal voltage from the image sensor.

The foregoing is merely illustrative and various modifications can be made to the described embodiments. The foregoing embodiments may be implemented individually or in any combination.

What is claimed is:

1. An image sensor comprising:
   an array of pixels arranged in rows and columns and configured to generate image signals in response to incident light;
   column output lines configured to output the image signals generated by the pixels in a respective row of pixels, wherein each column output line is coupled to a respective column of the array of pixels; and
   predictive pre-charge circuitry coupled to the column output lines and configured to pre-charge the column output lines based on the image signals generated by at least one previous row of the array of pixels before the image signals generated by the pixels in the respective row of pixels are output over the column output lines.

2. The image sensor defined in claim 1 further comprising:
   column readout circuitry coupled to the predictive pre-charge circuitry and configured to read out the image signals generated by the array of pixels.

3. The image sensor defined in claim 2 wherein the predictive pre-charge circuitry comprises memory that is configured to store the image signals generated by at least one row of image pixels.

4. The image sensor defined in claim 3 wherein the memory is configured to store the image signals generated by a single row of image pixels and wherein the predictive pre-charge circuitry is configured to pre-charge the column output lines based on the image signals generated by a single previous row of the array of image pixels.

5. The image sensor defined in claim 3 wherein the memory is configured to store the image signals generated by a plurality of rows of image pixels and wherein the predictive pre-charge circuitry is configured to pre-charge the column output lines based on an average of the image signals generated by a plurality of previous rows of the array of image pixels.

6. The image sensor defined in claim 3 wherein the predictive pre-charge circuitry further comprises first and second capacitors coupled to one of the column output lines and coupled to the memory through respective first and second switches and wherein at least one of the first and second capacitors is configured to receive the stored image signals from the memory.

7. The image sensor defined in claim 6 wherein the second capacitor is coupled to a ramp voltage through a third switch, wherein the predictive pre-charge circuitry further comprises a comparator coupled to the first and second capacitors and to the memory, and wherein the comparator is configured to compare voltages stored on the first and second capacitors as the ramp voltage applies an increasing voltage to the second capacitor.

8. The image sensor defined in claim 7 wherein the comparator includes analog-to-digital conversion circuitry and wherein the predictive pre-charge circuitry further comprises digital-to-analog conversion circuitry coupled between the memory and the first and second switches.

9. The image sensor defined in claim 1 wherein the array of pixels is a monochrome array and wherein the predictive pre-charge circuitry is configured to pre-charge the column output lines using the image signals generated by the at least one previous row of image pixels.

10. The image sensor defined in claim 1 wherein the array of pixels is a Bayer array, wherein the predictive pre-charge circuitry is configured to make gain corrections the image signals generated by the at least one previous row of image pixels to produce corrected image signals, and wherein the predictive pre-charge circuitry is configured to pre-charge the column output lines using the corrected image signals.

11. A method of predictively pre-charging column output circuitry using predictive pre-charge circuitry, the method comprising:
   generating image signals using an image pixel array comprising rows and columns of image pixels;
   using the column output circuitry, reading out the image signals generated by a first row of image pixels;
   storing the image signals generated by the first row of image pixels using the predictive pre-charge circuitry; and
   using the predictive pre-charge circuitry, charging the column output circuitry based on the stored image signals generated by the first row of image pixels.

12. The method defined in claim 11 further comprising:
   using the column output circuitry, reading out the image signals generated by a second row of image pixels; and
   storing the image signals generated by the second row of image pixels using the predictive pre-charge circuitry.

13. The method defined in claim 12 further comprising:
   for each respective remaining row of image pixels in the image pixel array:
      charging the image sensor output circuitry based on stored image signals using the predictive pre-charge circuitry, reading out the image signals generated by the respective row of image pixels using the column output circuitry, and replacing the stored image signals with the image signals generated by the respective row of image pixels.

14. The method defined in claim 11 wherein the image pixel array is a monochrome array and wherein charging the column output circuitry based on the stored image signals generated by the first row of image pixels comprises charging the column output circuitry using the image signals generated by the first row of image pixels.

15. The method defined in claim 11 wherein the image pixel array is a Bayer array, the method further comprising:

using the predictive pre-charge circuitry, making gain corrections to the image signals generated by the first row of image pixels to produce corrected image signals, wherein charging the column output circuitry based on the stored image signals generated by the first row of image pixels comprises charging the output circuitry using the corrected image signals.

16. An image sensor comprising:

an image pixel array comprising rows and columns of image pixels that are configured to generate image signals;

column output lines, wherein each column output line is coupled to a respective column of image pixels;

column readout circuitry coupled to the column output lines and configured to read out the generated image signals generated by each row of image pixels; and predictive pre-charge circuitry between each of the column output lines and the column readout circuitry, wherein the predictive pre-charge circuitry comprises:

first and second capacitors coupled to a respective one of the column output lines, a comparator coupled to top plates of the first and second capacitors, and memory circuitry coupled to the comparator and to bottom plates of the first and second capacitors through respective first and second switches.

17. The image sensor defined in claim 16, wherein the memory circuitry is configured to store image signals generated by at least one previous row of image pixels and wherein the bottom plate of the second capacitor is configured to receive the stored image signals before the image signals generated by a respective row of image pixels are read out.

18. The image sensor defined in claim 17 wherein the column output line is configured to apply a reset voltage to the first and second capacitors, wherein the memory circuitry is configured to apply the stored image signals to the first and second capacitors, and wherein the comparator is configured to determine a first difference between the voltages at the first and second capacitors to determine an offset of the comparator.

19. The image sensor defined in claim 18 wherein the column output line is configured to apply an image signal to the second capacitor and wherein the comparator is configured to determine a second difference between the voltages at the first and second capacitors to determine a signal voltage.

20. The image sensor defined in claim 19 wherein the predictive pre-charge circuitry is configured to store the signal voltage in the memory circuitry and wherein the column readout circuitry is configured to output the signal voltage.

* * * * *